United States Patent
Montminy

(10) Patent No.: US 9,198,235 B2
(45) Date of Patent: Nov. 24, 2015

(54) CONNECTION PIECE MADE OF A COMPOSITE OF GRAPHITE AND CARBON-FIBER-REINFORCED CARBON AND METHOD OF MANUFACTURING THE CONNECTION PIECE

(75) Inventor: John Montminy, Mooresville, NC (US)

(73) Assignee: SGL Carbon SE, Wiesbaden (DE)

( * ) Notice: Subject to any disclaimer, the term of this patent is extended or adjusted under 35 U.S.C. 154(b) by 731 days.

(21) Appl. No.: 13/453,303

(22) Filed: Apr. 23, 2012

(65) Prior Publication Data

US 2012/0234598 A1 Sep. 20, 2012

Related U.S. Application Data

(63) Continuation of application No. PCT/EP2010/064677, filed on Oct. 1, 2010.

(60) Provisional application No. 61/254,485, filed on Oct. 23, 2009.

(51) Int. Cl.
  *H05B 7/14* (2006.01)
  *H05B 7/06* (2006.01)

(52) U.S. Cl.
  CPC ........................................ *H05B 7/14* (2013.01)

(58) Field of Classification Search
  CPC ............ H05B 7/14; H05B 7/085; H05B 7/06; H05B 7/101; H05B 7/07; H05B 7/08; H05B 7/12; F27B 3/085
  USPC ......... 373/88, 90, 91, 92; 174/84 R; 428/408, 428/367
  See application file for complete search history.

(56) References Cited

U.S. PATENT DOCUMENTS

| | | | | |
|---|---|---|---|---|
| 2,527,294 | A | * | 10/1950 | Bailey ............................ 313/332 |
| 3,048,433 | A | * | 8/1962 | Doetsch ........................ 403/267 |
| 4,998,709 | A | * | 3/1991 | Griffin et al. .................... 373/92 |
| 2004/0265591 | A1 | | 12/2004 | Frohs et al. |
| 2007/0025411 | A1 | | 2/2007 | Smith et al. |
| 2007/0134422 | A1 | * | 6/2007 | Frohs ............................ 427/303 |
| 2007/0280327 | A1 | | 12/2007 | Smith et al. |
| 2008/0247440 | A1 | | 10/2008 | Artman et al. |

FOREIGN PATENT DOCUMENTS

| | | |
|---|---|---|
| EP | 0 453 073 A2 | 10/1991 |
| EP | 1 460 883 A2 | 9/2004 |

OTHER PUBLICATIONS

International Search Report of PCT/EP2010/064677, Dated Dec. 14, 2010.

\* cited by examiner

*Primary Examiner* — Hung D Nguyen
(74) *Attorney, Agent, or Firm* — Laurence A. Greenberg; Werner H. Stemer; Ralph E. Locher

(57) ABSTRACT

A connection piece for connecting graphite electrodes contains at least one region made of graphite and at least one region made of carbon-fiber-reinforced carbon. The graphite contains less than 10 mass-% of fibers and the carbon-fiber-reinforced carbon contains more than 20 mass-% of carbon fibers. The connection piece preferably contains a graphite body in the shape of a cylinder or a bi-cone. There is a plurality of groove-shaped recesses in the graphite body which are filled with the material made of carbon-fiber-reinforced carbon having a percent by weight of carbon fibers of more than 20 mass-%.

29 Claims, 3 Drawing Sheets

CONNECTION PIECE MADE OF A COMPOSITE OF GRAPHITE AND CARBON-FIBER-REINFORCED CARBON AND METHOD OF MANUFACTURING THE CONNECTION PIECE

CROSS-REFERENCE TO RELATED APPLICATION

This is a continuation application, under 35 U.S.C. §120, of copending international application No. PCT/EP2010/064677, filed Oct. 1, 2010, which designated the United States; this application also claims the priority, under 35 U.S.C. §119, of U.S. provisional Patent Application No. 61/254,485, filed Oct. 23, 2009; the prior applications are herewith incorporated by reference in their entireties.

BACKGROUND OF THE INVENTION

Field of the Invention

The present invention relates to a connection piece for connecting graphite electrodes.

Among other things, electrodes based on carbon are used in electrothermal processes, and in particular during the production of steel in electric arc furnaces for fusing melting charges. In light of the good thermal conductivity, low electrical resistance, high thermal shock resistance and chemical resistance of graphite, in particular graphite electrodes are used for this purpose.

When used in an electric arc furnace, the graphite electrode is subjected to an electrical voltage, as the result of which an electric arc leading from the lower end of the graphite electrode to the melting charge is generated, producing temperatures high enough (e.g., 1,500° C.) to fuse the melting charge, for example steel scrap or iron sponge. Due to the high temperatures inside the electric arc furnace and the electric arc, the lower end of the graphite electrode slowly burns off, thereby consuming the graphite electrode. As a result, this application usually involves the use of an electrode string comprised of a plurality of interconnected graphite electrodes, wherein the electrode string is subsequently pushed into the electric arc furnace in increments reflecting the extent to which the lower electrode end burns off during furnace operation. As soon as the electrode string has dropped below a prescribed minimum length, one or more new electrodes are screwed to the upper end of the electrode string.

The individual electrodes of the electrode string are mechanically connected with each other in an electrically conductive manner via connecting pieces, which are also referred to as nipples, and usually consist of graphite. The two faces of the individual, conventionally cylindrical electrodes for accommodating the connecting pieces each exhibit a recess provided with a female thread or threaded box having a geometry complementary to the outer contour of the connecting piece. A respective connecting piece provided with a male thread is screwed into the threaded boxes to interconnect the two electrodes via their respective faces. The connecting pieces are here usually dual truncated or shaped like bicone or cylinder.

A high mechanical, thermal and electrical load is placed on the electrode string during the operation of an electric arc furnace. For example, given strong inhomogeneities in the molten steel, e.g., as the result of scrap metal pieces floating thereon, strong bending forces arise on the electrode string, and can result in a break in the connecting pieces or electrodes.

In addition, the diameter of the graphite electrode string decreases due to oxidation on the lateral walls during electric arc furnace operation, so that in particular the diameter of the end of the electrode string facing the molten steel bath is greatly diminished. As described, the electrodes are spent during electric arc furnace operation, causing individual connecting pieces to sink to the molten bath level. This produces considerable thermal gradients in the electrode connections, leading to significant circumferential stresses on the walls of the threaded shafts, which in turn generates cracks in the threaded shaft walls. The thinner the threaded shaft walls become through oxidation, the more the circumferential stresses increase. Smaller circumferential stresses arise given thicker threaded shaft walls, i.e., when using smaller nipples.

For this reason, it is desirable to make the walls of the threaded shafts thicker, meaning to either increase the electrode diameter at the same threaded shaft diameter, or decrease the threaded shaft diameter at the same electrode diameter. However, the outside diameter of graphite electrodes is generally predetermined by the planned use, so that increasing the electrode diameter is out of the question. On the other hand, decreasing the threaded shaft diameter would greatly diminish the mechanical strength of the connections, particularly in the upper portion of the electrode string, since connection pieces or graphite nipples with a smaller diameter would then be used, which naturally exhibit less strength than those with a larger diameter. This would in turn increase the likelihood of a break in the upper region of the electrode string, whereupon the broken electrode string would fall into the melt, thereby resulting in significant losses in production.

In order to increase the mechanical strength of such connection pieces, it has already been proposed, for example in published, European patent application EP 1 460 883 A2, corresponding to U.S. patent publication No. 2004/0265591, that nipples made out of graphite be replaced with the alternative of nipples comprised of graphite reinforced with carbon fibers, in which 0.2 to 10% carbon fibers whose surfaces have been oxidatively activated and additionally provided with a carbonized coating are homogeneously distributed in a graphite matrix. However, the mechanical strength of the nipples is not high enough, so that the diameter of the nipples cannot be decreased to surmount the aforementioned problems without the mechanical strength of the nipples becoming inadequate.

SUMMARY OF THE INVENTION

Therefore, the object of the present invention is to provide a graphite-based connection piece, which exhibits a better mechanical strength, so that the latter can connect graphite electrodes into an electrode string that is stable enough for use in an electric arc furnace, in particular even when the connection piece exhibits a smaller diameter than required for the connection pieces known from prior art.

According to the invention, the object is achieved by providing a connection piece for connecting graphite electrodes, which encompasses at least one area of graphite and at least one area of carbon-fiber-reinforced carbon, wherein the graphite contains less than 10 mass percent fibers, and the carbon-fiber-reinforced carbon contains more than 20 mass percent carbon fibers.

This solution is based on the surprising discovery that such a connection piece formed of a composite, in which a single region or several individual regions of a material formed of carbon-fiber-reinforced carbon (CFC) with a mass fraction of carbon fibers exceeding 20%, and the remaining region(s) is/are composed of graphite (with a fiber content of less than 10 mass percent), exhibits a considerably higher mechanical strength, in particular a higher tensile strength and a higher flexural strength, in comparison to the graphite nipples known from prior art, particularly also in comparison to those in which the carbon fibers are homogenously distributed over the entire nipple. In addition, the individual regions surprisingly do not delaminate, even though they exhibit differing thermal expansion coefficients. The above makes the connection piece according to the invention outstandingly suited for connecting graphite electrodes to form an electrode string. In particular, the connection piece according to the invention can be used for this purpose with a comparatively small diameter due to its excellent mechanical strength, specifically in particular with half the minimum diameter necessary in graphite nipples known from the prior art for achieving a sufficient strength. For this reason, the connection piece according to the invention can be used to connect graphite electrodes with a threaded shaft exhibiting a correspondingly smaller diameter to form an electrode string that is stable enough for use in an electric arc furnace. The lower diameter of the threaded shafts makes it possible to significantly reduce the circumferential stresses in the walls of the threaded shafts provided in the electrodes, and thus crack formation in the walls of the threaded shafts and resultant material losses when using the electrodes in an electrode string in an electric arc furnace.

According to the invention, the connection piece encompasses one or more regions or domains made of graphite, wherein the graphite contains less than 10 mass percent of fibers, if it contains any fibers at all, and one or more regions or domains made of CFC, wherein the CFC material contains more than 20 mass percent carbon fibers. The at least one region of graphite preferably contains less than 5 mass percent fibers, and very especially preferred no fibers, while the CFC material preferably contains at least 30 mass percent carbon fibers.

Consequently, the connection piece according to the invention encompasses high-fiber regions and low-fiber or no-fiber regions. The individual regions can here exhibit any geometry desired, and be arranged as desired relative to each other, provided they adjoin each other. However, it is preferred that the region(s) of CFC material be at least partially enveloped by the region(s) of graphite.

The latter embodiment can be illustrated in such a way that the connection piece according to the invention encompasses at least one graphite body, which is provided with at least one recess, wherein the at least one recess incorporates a material formed of carbon-fiber-reinforced carbon, wherein the graphite contains less than 10 mass percent fibers, and the carbon-fiber-reinforced carbon contains more than 20 mass percent carbon fibers. The at least one recess is preferably filled or occupied with the CFC material. The at least one recess can here be provided in the graphite body from the very outset, for example, by molding the latter into a corresponding shape in the production process, or the at least one recess can be introduced into the graphite body after the fact, for example, by milling grooved recesses into a cylindrical graphite body.

In order to achieve a strong connection between the graphite body and material formed of carbon-fiber-reinforced carbon, it is proposed in a further development of the underlying idea of the invention that the material formed of carbon-fiber-reinforced carbon provided in the at least one recess be connected with the graphite body by way of a binder. To this end, the material formed of the carbon-fiber-reinforced carbon can be machined into the shape of the recess, and then placed into the recess of the graphite body along with a binder, for example by coating the material formed of the CFC with the binder on its outside surfaces, before the connection piece obtained in this way is subjected to a heat treatment, e.g., at 100 to 300°, so as to rigidly bond the CFC material with the graphite body.

Any binder based on a carbonaceous material can essentially be used for this purpose, wherein good results are attained especially if the binder is selected from the group consisting of phenol resins, pitches, furan resins, phenyl esters and any mixtures of two or more of the aforementioned compounds.

The material formed of carbon-fiber-reinforced carbon provided in the at least one recess of the graphite body is made up of a carbon matrix that contains carbon fibers. The parent material for the matrix of the CFC material can be comprised of carbonaceous materials, in particular those selected from the group consisting of phenol resins, pitches, furan resins, phenyl esters and any mixtures of two or more of the aforementioned compounds, while the parent material for the carbon fibers is preferably comprised of pitch, polyacrylonitrile, peroxidized polyacrylonitrile or cellulose. Use can also be made of fiber mixtures of the above materials, or bifilaments comprised of two or more of the aforementioned parent materials.

The carbon fibers can be endless fibers or staple fibers, for example which exhibit a length of between 5 and 250 mm, and preferably between 5 and 100 mm. It is just as possible for the carbon fibers to be present in the form of fiber bundles, knitted fabrics, knotted fabrics, nonwoven fabrics, meshes or scrims, arranged either unidirectionally or multiaxially.

In another especially preferred embodiment of the present invention, the carbon fibers of the CFC material are configured in the form of a fabric, or especially preferred in the form of a fabric laminate, in which several fabric layers are situated one over the other and joined together. These CFC fabric materials preferably exhibit a 3-point flexural strength of at least 150 MPa, especially preferably of at least 200 MPa, and very especially preferred of at least 250 MPa.

For example, such fabric laminates can be fabricated by manufacturing fabrics out of carbonized and/or graphitized fibers, in particular endless fibers, which are then impregnated with a resin to form prepregs, before several prepregs are laminated one on top of the other. The individual prepregs can here be situated on top of each other either parallel or twisted by 90° relative to each other, for example. The laminate is subsequently press molded, hardened, carbonized and optionally graphitized. Carbonization here preferably takes place at a temperature of between 600 and 1,200° C., and optional graphitization at a temperature of between 1,800 and 3,000, and especially preferred between 2,000 and 2,500° C. After carbonization and before optional graphitization, the laminate can optionally be impregnated once or repeatedly, for example 3 or 4 times, with a resin or pitch, wherein the individual impregnation steps are each followed by a renewed carbonization. Phenol resin, pitch, furan resin and/or phenyl ester are preferably used as the binder or matrix material in this embodiment as well, while pitch, polyacrylonitrile, peroxidized polyacrylonitrile or cellulose are used as the parent material for the carbon fibers.

A further development of the inventive idea proposes that the CFC material exhibit a density of between 1.2 and 1.8 g/cm$^3$, especially preferably between 1.4 and 1.6 g/cm$^3$, and very especially preferred of about 1.5 g/cm$^3$.

The mass fraction of carbon fibers in the material formed of carbon-fiber-reinforced carbon preferably measures more than 20 to 80%, especially preferably 30 to 70%, and very especially preferred 40 to 60%, for example about 50%.

While the at least one recess, and hence the at least one region of CFC material, can basically be situated at any location of the graphite body, and exhibit any conceivable geometry, the at least one recess is preferably configured in the form of a groove or slit. It is especially preferred that the at least one recess extend in the longitudinal direction of the connection piece, i.e., in the connection direction of the connection piece, and extend in the plane perpendicular to the longitudinal direction of the connection piece, i.e., transverse to the longitudinal direction of the connection piece, inwardly from the external side of the graphite body. In other words, in the case of a cylindrical graphite body, the at least one recess exhibits a cuboid or wedge shape and extends inwardly from the outer circumferential surface of the graphite body.

In general, the at least one recess, and hence the at least one region of CFC material, can extend over as large as desired a portion of the longitudinal expansion of the graphite body, i.e., of the extension of the graphite body, or completely over the longitudinal expansion of the graphite body. Good results are achieved in particular if the at least one recess extends over at least 50%, preferably at least 70%, especially preferably at least 90%, and very especially preferred 100% of the longitudinal expansion of the graphite body. However, it is also possible, if less preferable, for the at least one recess to extend over less than 50% of the longitudinal expansion of the graphite body.

As explained above, the at least one recess, and hence the region of CFC material, preferably extends inwardly from the outer circumferential surface of the graphite body. It is basically possible, if less preferable, for the at least one recess to extend transversely through the graphite body. However, it is preferred that the at least one recess not extend inwardly from the external side or outer circumferential surface of the graphite body over in excess of the central axis of the graphite body. Viewed from the plane transverse to the longitudinal direction of the connection piece, the at least one recess preferably extends inwardly from the external side or outer circumferential surface of the graphite body over 10 to less than 100%, preferably 20 to 80%, especially preferably 30 to 70%, very especially preferred 40 to 70%, and most preferably about 50% of the distance between the external side and central axis of the graphite body.

In another preferred embodiment of the present invention, the total volume of all recesses, and hence the total volume of the carbon-fiber-reinforced carbon, relative to the total volume of the connection piece measures 5 to 75%, preferably 10 to 50%, and very especially preferred 20 to 40%.

The connection piece according to the invention is not limited in terms of the number of recesses or regions of carbon-fiber-reinforced carbon. If the latter exhibits at least two recesses, which is preferred, the individual recesses are preferably roughly the same size, and in particular uniformly distributed over the cross section of the connection piece. Good results are obtained in particular if the graphite body exhibits 2 to 50 recesses, especially preferably 2 to 32 recesses, very especially preferred 5 to 32 recesses, and most preferably 8 to 24 recesses, for example 16 or 24 recesses, which are occupied by the material formed of carbon-fiber-reinforced carbon. The individual recesses each preferably extend inwardly in the shape of wedge from the outer circumferential surface of the connection piece, and are preferably identically sized and distributed uniformly over the cross section of the connection piece.

Even though the connection piece can essentially assume any geometric shape desired, it is preferably shaped like a cylinder, or especially preferably shaped like a bicone, i.e., dual truncated, wherein the two truncated cones are joined together at their footprint.

As described, the connection piece according to the invention exhibits a higher mechanical strength, and in particular a higher tensile strength and flexural strength, by comparison to the graphite nipples known from prior art, in which carbon fibers are homogenously distributed over the entire volume of the connection piece. For this reason, the connection piece according to the invention can be used to stably connect graphite electrodes to each other, even and in particular when the connection piece exhibits a smaller diameter in comparison to the connection pieces known from prior art, e.g., by 25 to 75%, and in particular by at least 50%. For example, while conventional connection pieces for connecting standard graphite electrodes with a length of 2,700 mm and a diameter of 600 mm exhibit a diameter of 317 mm, the same graphite electrodes can be connected with the identical stability using the connection pieces according to the invention if the connection pieces according to the invention exhibit a diameter of 150 mm.

Any graphite precursor known to the expert can be used as the parent material for the graphite for the at least one region comprised of graphite or the graphite body of the connection piece according to the invention, in particular a mixture of coke and binder. The used coke preferably exhibits a particle size of less than 10 mm, especially preferably of less than 5 mm, and very especially preferred 0.01 to 3 mm. For example, pitch coke, metallurgical coke or petroleum coke, in particular needle coke, can be used as the coke, while pitch is preferably used as the binder. The mixture ratio between the coke and binder preferably measures 5:1 to 2:1, and especially preferably about 4:1. A slight amount of 0.1 to 0.5% w/w iron oxide can be included in this mixture as an additive. Even though the mixture can also contain fibers up to a mass fraction of less than 10%, it is preferred that it contain at most 5 mass percent, and especially preferably no fibers, as described above. For example, the mixture is then molded into the desired shape through extrusion, and then carbonized and graphitized. Graphitization can be preceded by one or more impregnation steps, in which the molded part is impregnated with an impregnating means, e.g., impregnating pitch, and then carbonized again. As an option, one or more (post) impregnations can be performed after graphitization, followed respectively by carbonization.

The present invention also relates to a method for manufacturing a connection piece according to the invention of the kind described above, which encompasses the following steps:

i) Preparing a graphite body containing zero or less than 10 mass percent fibers,
ii) Preparing a material comprised of carbon-fiber-reinforced carbon, which contains more than 20 mass percent fibers,
iii) Connecting the graphite body with the material comprised of carbon-fiber-reinforced carbon by use of a binder, and
iv) Threading the structure obtained in step iii).

The CFC material is preferably at least partially enveloped by the graphite body. In this embodiment, the method preferably encompasses the following steps:

a) Preparing a graphite body, preferably in the form of a cylinder or bicone,
b) Providing at least one recess in the graphite body by machining the graphite body,
c) Preparing a carbon-fiber-reinforced carbon in the form of the at least one recess,
d) Incorporating a binder and the carbon-fiber-reinforced carbon into the at least one recess, e) Heat treating the structure obtained in step d), and
f) Threading the structure obtained in step e).

For example, the graphite body can be prepared according to procedural step a) by molding a mixture of a binder and coke into the shape of a cylinder or bicone, and then carbonizing and graphitizing the body obtained in this way. As an option, an impregnation step involving the use of an impregnating means, e.g., pitch, can be interspersed between molding and graphitization. For example, impregnation can take place under a vacuum for 2 to 10 hours, wherein impregnation is preferably followed by a heat treatment, e.g., at between 600 and 1,000° C., in particular 700 and 900° C., e.g., for 2 to 10 hours, in particular 4 to 6 hours.

The at least one recess can be introduced in procedural step b) using any known machining technique, e.g., by milling. As an alternative, the graphite body can be molded into a shape already containing the at least one recess during the molding step, e.g. extrusion.

A further development of the inventive idea proposes that the graphite body be provided in procedural step b) with 2 to 50 recesses, preferably 2 to 32 recesses, especially preferably 5 to 32 recesses, and very especially preferred 8 to 24 recesses, which are preferably uniformly distributed over the cross section of the connection piece. It is here preferred that the individual recesses extend in the longitudinal direction of the connection piece, and extend inwardly from the external side of the connection piece transverse to the longitudinal direction of the connection piece.

The carbon-fiber-reinforced carbon can be manufactured in procedural step c) by carbonizing and/or graphitizing carbon fibers, e.g., peroxidized polyacrylonitrile fibers, polyacrylonitrile fibers, cellulose fibers and/or pitch fibers before the carbon fibers obtained in this way are especially preferably processed into a fabric or fabric laminate, which is subsequently impregnated with a binder before the construct obtained in this way is carbonized and, if necessary, graphitized. For example, the binder used in the process is one selected from phenol resins, pitches, furan resins, phenyl esters and any mixtures of two or more of the aforementioned compounds.

The binder incorporated in procedural step d) along with the carbon-fiber-reinforced carbon is also preferably selected from of phenol resins, pitches, furan resins, phenyl esters and any mixtures of two or more of the aforementioned compounds.

In another preferred embodiment of the present invention, the heat treatment is performed in procedural step e) at a temperature of between 100 and 300° C.

The present invention also involves a connection piece that can be obtained with the method according to the invention described above.

The present invention further relates to the use of an above described connection piece according to the invention for connecting two electrodes, preferably two graphite electrodes, or the use of several of the above described connection pieces according to the invention for connecting several electrodes, preferably graphite electrodes, to form an electrode string.

Finally, the present invention relates to an electrode string that encompasses two or more graphite electrodes, of which a respective two graphite electrodes are connected with each other by a respective connection piece according to the invention.

Other features which are considered as characteristic for the invention are set forth in the appended claims.

Although the invention is illustrated and described herein as embodied in a connection piece made of a composite of graphite and carbon-fiber-reinforced carbon and method of manufacturing the connection piece, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
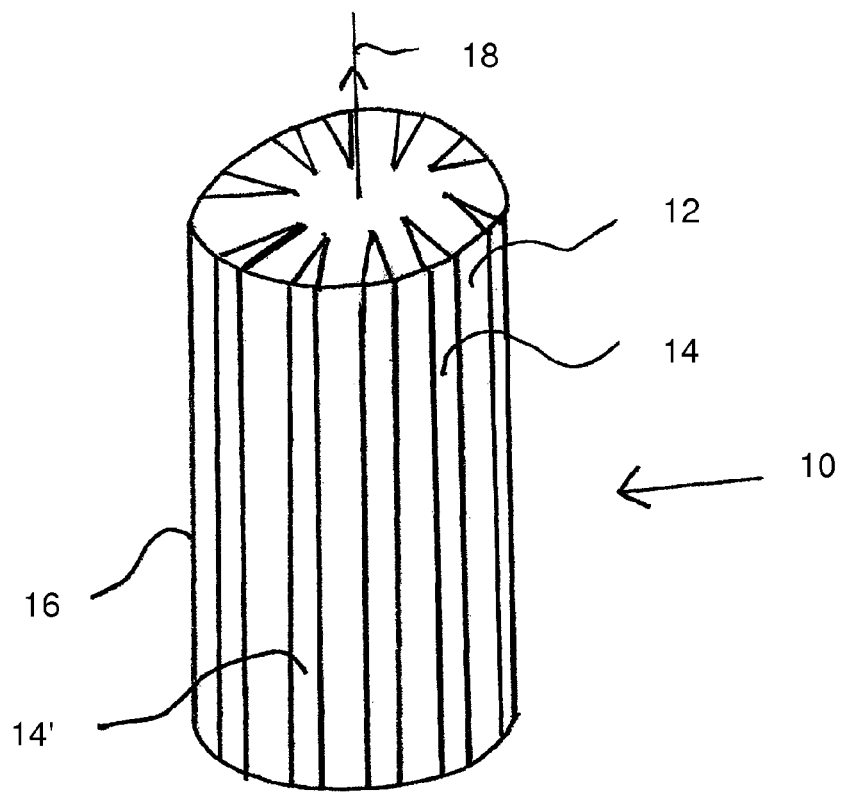
FIG. 1 is a diagrammatic, perspective view of a first exemplary embodiment of a connection piece according to the invention.
Figure 2:
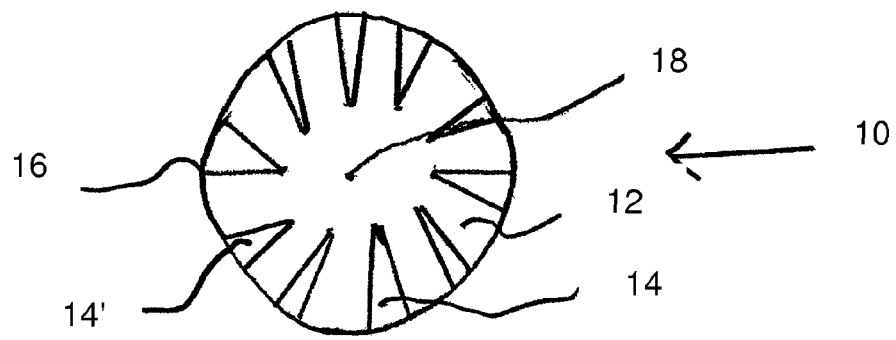
FIG. 2 is a top plan view of the connection piece depicted on FIG. 1.

Referring now to the figures of the drawing in detail and first, particularly, to FIGS. 1 and 2 thereof, there is shown a connection piece 10 that has a graphite body 12, which exhibits ten wedge-shaped recesses 14, 14' that are occupied by a material formed of carbon-fiber-reinforced carbon. The wedge-shaped recesses 14, 14' here extend over the entire longitudinal expansion of the graphite body 12 and, viewed in the direction transverse to the longitudinal axis of the connection element 10, inwardly from the outer circumferential surface or external side 16 of the graphite body 12 over about 50% of the distance between the external side 16 and central axis 18 of the graphite body 12.

While the graphite body 12 is formed of a no-fiber graphite, the carbon-fiber-reinforced carbon contains more than 20 mass percent carbon fibers. The material formed of carbon-fiber-reinforced carbon is connected with the graphite body 12 via a non-illustrated binder. The outer circumferential surface of the connection piece 10 is provided with a non-illustrated male thread.

Figure 3:
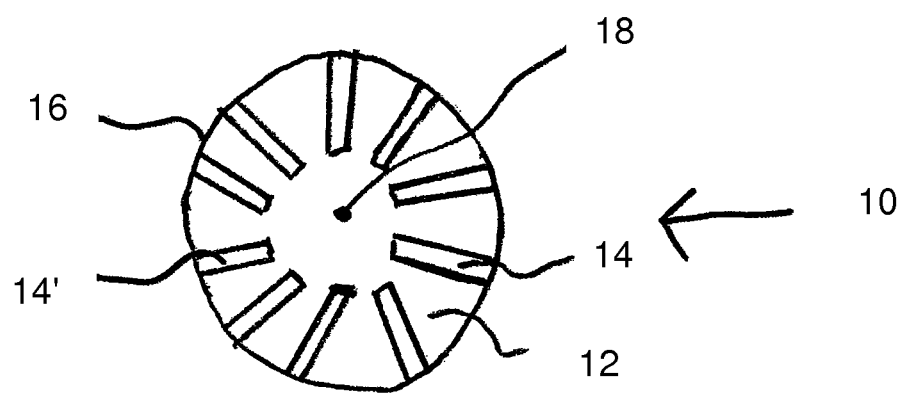
FIG. 3 is a top plan view of a second exemplary embodiment of the connection piece according to according to the invention.

The connection piece shown in FIG. 3 differs from the one depicted on FIGS. 1 and 2 in that the individual recesses 14, 14' filled with the material comprised of carbon-fiber-reinforced carbon are not wedge-shaped, but rather configured like a flat cuboid.

Figure 4:
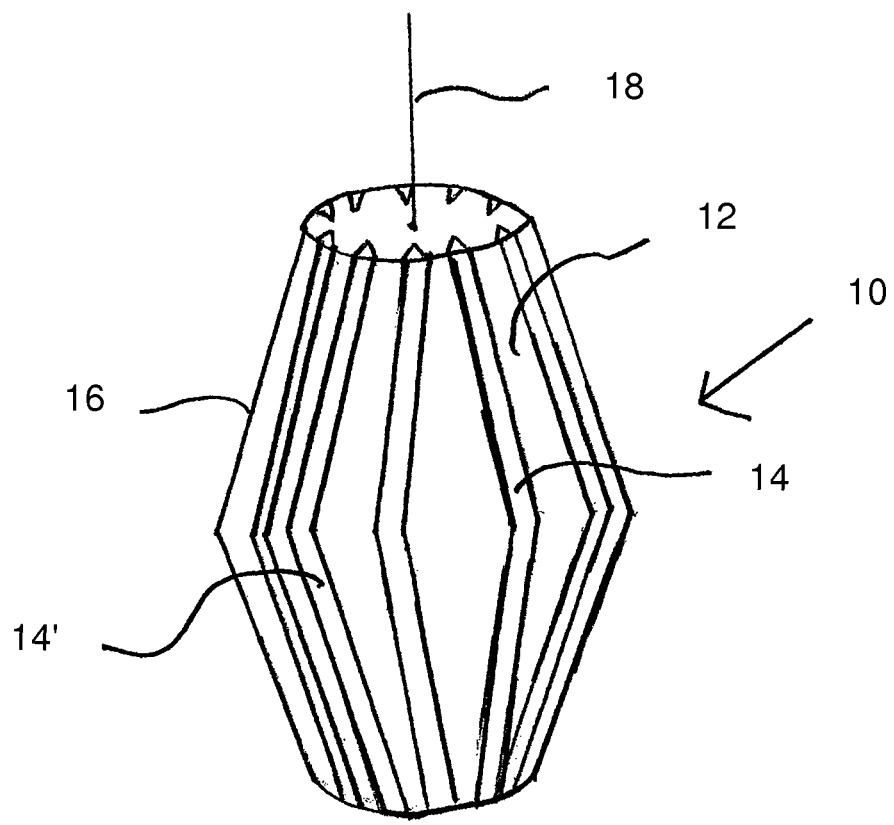
FIG. 4 is a perspective view of a third exemplary embodiment of the connection piece according to the invention.

As opposed to the connection piece 10 shown on FIG. 1, the connection piece depicted on FIG. 4 is configured in the form of a bicone, i.e., dual truncated, wherein the two truncated cones are joined together at their footprint. The outer circumferential surface of the connection piece 10 is provided with a non-illustrated male thread.

The invention claimed is:

1. A connection piece for connecting graphite electrodes, the connection piece comprising:
   at least one graphite region having graphite with less than 10 mass percent of fibers;
   at least one carbon-fiber-reinforced carbon region having carbon-fiber-reinforced carbon with more than 20 mass percent of carbon fibers; and said at least one graphite region is a graphite body having a plurality of wedged shaped recesses formed therein and an external side, said recesses each extending inwardly from said external side of said graphite body transverse to a longitudinal direction of said graphite body over less than 100% of a distance between said external side and a central axis being in a center of said graphite body, said carbon-fiber-reinforced carbon is disposed in said recesses.

2. The connection piece according to claim 1, wherein said graphite contains less than 5 mass percent of said fibers.

3. The connection piece according to claim 1, wherein said at least one carbon-fiber-reinforced carbon region is enveloped at least partially by said at least one graphite region.

4. The connection piece according to claim 1, further comprising a binder, said carbon-fiber-reinforced carbon disposed in said recesses is connected with said graphite body by means of said binder.

5. The connection piece according to claim 1, wherein said carbon fibers are present in said carbon-fiber-reinforced carbon in a form of a fabric or a fabric laminate, in which several fabric layers of said fabric or said fabric laminate are disposed one on top of anther and connected with each other.

6. The connection piece according to claim 1, wherein a mass fraction of said carbon fibers in said carbon-fiber-reinforced carbon measures more than 20 to 80%.

7. The connection piece according to claim 1, wherein said recesses each extend over at the least 50% of a longitudinal direction of said graphite body.

8. The connection piece according to claim 1, wherein said recesses each extend inwardly from said external side of said graphite body transverse to the longitudinal direction of said graphite body over 10 to less than 100% of the distance between said external side and said central axis of said graphite body.

9. The connection piece according to claim 1, wherein a total volume of all of said recesses relative to a total volume of the connection piece measures 5 to 75%.

10. The connection piece according to claim 1, wherein said recesses are in a range of 2 to 50 recesses formed in said graphite body which are occupied by said carbon-fiber-reinforced carbon.

11. The connection piece according to claim 1, wherein said graphite body has a form selected from the group consisting of a cylinder form and a bicone form.

12. The connection piece according to claim 1, wherein said graphite contains no said fibers.

13. The connection piece according to claim 1, wherein a mass fraction of said carbon fibers in said carbon-fiber-reinforced carbon measures more than 30 to 70%.

14. The connection piece according to claim 1, wherein a mass fraction of said carbon fibers in said carbon-fiber-reinforced carbon measures more than 40 to 60%.

15. The connection piece according to claim 1, wherein said recesses each extend over at least 70% of a longitudinal direction of said graphite body.

16. The connection piece according to claim 1, wherein said recesses each extend over at least 90% of a longitudinal direction of said graphite body.

17. The connection piece according to claim 1, wherein said recesses each extend 100% of the longitudinal direction of said graphite body.

18. The connection piece according to claim 1, wherein said recesses each extend inwardly from said external side of said graphite body transverse to the longitudinal direction of said graphite body from 20 to 80% of the distance between said external side and the central axis of said graphite body.

19. The connection piece according to claim 1, wherein said recesses each extend inwardly from said external side of said graphite body transverse to the longitudinal direction of said graphite body from 30 to 70% of the distance between said external side and the central axis of said graphite body.

20. The connection piece according to claim 1, wherein said recesses each extend inwardly from said external side of said graphite body transverse to the longitudinal direction of said graphite body from 40 to 70% of the distance between said external side and the central axis of said graphite body.

21. The connection piece according to claim 1, wherein a total volume of all of said recesses relative to a total volume of the connection piece measures 10 to 50%.

22. The connection piece according to claim 1, wherein a total volume of all of said recesses relative to a total volume of the connection piece measures 20 to 40%.

23. The connection piece according to claim 1, wherein said recesses are in a range of 2 to 32 recesses formed in said graphite body and are occupied by said carbon-fiber-reinforced carbon.

24. The connection piece according to claim 1, wherein said recesses are in a range of 5 to 32 recesses formed in said graphite body and are occupied by said carbon-fiber-reinforced carbon.

25. The connection piece according to claim 1, wherein said recesses are in a range of 8 to 24 recesses formed in said graphite body and are occupied by said carbon-fiber-reinforced carbon.

26. A method for manufacturing a connection piece, which comprises the steps of:
   i) providing a graphite body containing less than 10 mass percent of fibers and having a plurality of wedged shaped recesses formed therein and an external side, the recesses each extending inwardly from the external side of the graphite body transverse to a longitudinal direction of the graphite body over less than 100% of a distance between the external side and a central axis in a center of the graphite body;
   ii) preparing a material formed of a carbon-fiber-reinforced carbon, the material containing more than 20 mass percent of fibers;
   iii) connecting the graphite body with the material formed of carbon-fiber-reinforced carbon by means of a binder resulting in a connection piece structure; and
   iv) threading the connection piece structure.

27. The method according to claim 26, which further comprises:
   a) preparing the graphite body to be one of cylinder shaped or bicone shaped;
   b) providing the recesses in the graphite body by machining the graphite body;
   c) forming the carbon-fiber-reinforced carbon in a form of the recesses;
   d) incorporating a binder and the carbon-fiber-reinforced carbon into the recesses;
   e) heat treating the structure obtained in step d); and
   f) threading the structure obtained in step e).

28. The method according to claim 27, which further comprises performing the heat treating at a temperature of between 100 and 300° C.

29. An electrode string, comprising:
   a connection piece containing at least one graphite region having graphite with less than 10 mass percent of fibers and at least one carbon-fiber-reinforced carbon region having a carbon-fiber-reinforced carbon with more than 20 mass percent of carbon fibers, said at least one graphite region is a graphite body having a plurality of wedged shaped recesses formed therein and an external side, said recesses each extending inwardly from said external side of said graphite body transverse to a longitudinal direction of said graphite body over less than 100% of a distance between said external side and a central axis in a center of said graphite body, said carbon-fiber-reinforced carbon is disposed in said recesses; and at least two graphite electrodes connected to each other by said connection piece.

* * * * *